US 11,361,285 B2

(12) United States Patent
Gardner et al.

(10) Patent No.: US 11,361,285 B2
(45) Date of Patent: Jun. 14, 2022

(54) METHOD AND SYSTEM OF PREVENTING DUPLICATE CHECK PRESENTATION

(71) Applicant: Gardner/Wyatt Ventures, LLC, Raleigh, NC (US)

(72) Inventors: John Gardner, Raleigh, NC (US); Edward Wyatt, Arlington, VA (US)

( * ) Notice: Subject to any disclaimer, the term of this patent is extended or adjusted under 35 U.S.C. 154(b) by 1131 days.

(21) Appl. No.: 15/142,545

(22) Filed: Apr. 29, 2016

(65) Prior Publication Data

US 2016/0321622 A1    Nov. 3, 2016

Related U.S. Application Data

(60) Provisional application No. 62/155,446, filed on Apr. 30, 2015.

(51) Int. Cl.

| | |
|---|---|
| *G06Q 20/04* | (2012.01) |
| *G06Q 20/40* | (2012.01) |
| *G06V 10/22* | (2022.01) |
| *G06V 30/418* | (2022.01) |
| *G06V 20/00* | (2022.01) |

(52) U.S. Cl.
CPC ....... *G06Q 20/042* (2013.01); *G06Q 20/4016* (2013.01); *G06V 10/225* (2022.01); *G06V 30/418* (2022.01); *G06V 20/95* (2022.01)

(58) Field of Classification Search
CPC ............. G06Q 20/042; G06Q 20/4016; G06K 9/00483; G06K 9/2063; G06K 2009/0059
See application file for complete search history.

(56) References Cited

U.S. PATENT DOCUMENTS

| | | |
|---|---|---|
| 5,237,394 A | 8/1993 | Eaton et al. |
| 6,201,234 B1 | 3/2001 | Chow et al. |
| 6,415,336 B1 | 7/2002 | Sansone et al. |
| 7,000,828 B2 | 2/2006 | Jones et al. |
| 7,137,551 B1 | 11/2006 | Crews et al. |
| 7,344,064 B2 | 3/2008 | Wilk et al. |
| 7,438,219 B1 | 10/2008 | Crews et al. |
| 7,708,201 B2 | 5/2010 | Page et al. |
| 8,328,091 B2 | 12/2012 | Ramachandran et al. |
| 8,611,635 B1 | 12/2013 | Medina et al. |
| 8,639,017 B1 * | 1/2014 | Anderson ............. G06K 9/186 382/137 |
| 8,837,806 B1 | 9/2014 | Ethington et al. |
| 8,959,033 B1 | 2/2015 | Morlen et al. |
| 2003/0009420 A1 | 1/2003 | Jones et al. |

(Continued)

*Primary Examiner* — Dave Czekaj
*Assistant Examiner* — Berteau Joisil
(74) *Attorney, Agent, or Firm* — Meunier Carlin & Curfman LLC

(57) ABSTRACT

A computerized method and system of validating a check at presentment for payment includes executing imaging software and decoding software stored in a computer memory housed in a computer, generating pixel data from the encoded indicia on the instrument, digitizing the pixel data to generate digital pixel data, storing the digital pixel data in the memory, generating a data set by decoding the digital pixel data, and transmitting the data set to a server over a network, wherein the server is configured to execute validation software to determine if the negotable instrument has been previously presented for payment. The computer then receives a validation indicator back from said server to display on the computer.

19 Claims, 2 Drawing Sheets

(56) References Cited

U.S. PATENT DOCUMENTS

| | | |
|---|---|---|
| 2004/0262121 A1 | 12/2004 | Chien et al. |
| 2005/0211763 A1* | 9/2005 | Sgambati .............. G06Q 40/00 235/379 |
| 2006/0202023 A1 | 9/2006 | Vankirk et al. |
| 2006/0261155 A1 | 11/2006 | Templeton et al. |
| 2011/0216960 A1 | 9/2011 | Vankirk et al. |
| 2013/0148874 A1 | 6/2013 | Jones et al. |
| 2013/0156289 A1 | 6/2013 | Hawkins et al. |
| 2014/0099001 A1 | 4/2014 | Nepomniachtchi et al. |
| 2014/0112571 A1 | 4/2014 | Viera et al. |

\* cited by examiner

METHOD AND SYSTEM OF PREVENTING DUPLICATE CHECK PRESENTATION

CROSS REFERENCE TO RELATED APPLICATIONS

This application incorporates by reference and claims priority to U.S. Provisional Patent Application Ser. No. 62/155,446 entitled Method and System of Preventing Duplicate Check Presentation.

FIELD OF THE INVENTION

The system and method disclosed herein relates to a system for preventing fraud perpetrated by individuals who present checks and other negotiable instruments for payment more than once.

BACKGROUND

Modern financial systems have developed computerized machinery and associated methods by which individuals can perform numerous transactions electronically. In one convenient process, individuals who receive checks for payment by a payor bank or other financial institution can use a computer, such as a smart phone or other mobile device, to transmit an image of the check, in addition to other identifying information, back to the payor institution for deposit credit. The system of remote deposits using known cameras on smart phones or other computers has been in place for quite some time in financial sectors that correspond with customers via internet access.

Along with the prevalence of remote deposit systems, the instances of fraudulent activity surrounding check deposits have increased dramatically. When a payee uses remote deposit systems, the original check or other instrument remains in the payee's possession unaltered. This original document is still available, therefore, for unauthorized use, such as by taking the same check that was previously presented by remote deposit and attempting to cash the check for payment again.

The prior art has consistently presented only one means of preventing fraudulent re-presentment of a negotiable instrument, and all of the solutions to the problem involve physically altering the check. After all, if a check has been physically noted, marred, or changed in a noticeable way, a subsequent holder of the check, who receives the check for a fraudulent payout, can identify the fact that the check has already been deposited or previously paid. There is a need in the art of financial instruments, therefore, to prevent fraudulently presenting checks or other negotiable instruments for double payment when the payee has already deposited the instrument electronically, such as by transmitting an image of the document to the original payor.

BRIEF SUMMARY OF THE EMBODIMENTS OF THE DISCLOSURE

In one embodiment, a system for determining if a negotiable instrument bearing an encoded indicia has been previously presented for payment includes a computer having a memory, a processor executing imaging software and decoding software stored in said memory; and a camera comprising an image reader assembly configured to generate pixel data from the encoded indicia on the instrument, wherein the imaging software processes the pixel data to generate digital pixel data and stores the digital pixel data in the memory. The processor executes the decoding software by receiving the digital pixel data from the memory and generates a data set from the encoded indicia. A transceiver in bi-directional communication with a server on a network is connected to the computer over a network and includes a database and validation software, the transceiver transmitting the data set to the server over the network. The server is configured to execute the validation software to determine if the negotiable instrument has been previously presented for payment.

In another embodiment, a computerized method of validating a check at presentment includes executing imaging software and decoding software stored in a computer memory housed in a computer, generating pixel data from the encoded indicia on the instrument, digitizing the pixel data to generate digital pixel data, storing the digital pixel data in the memory, generating a data set by decoding the digital pixel data, and transmitting the data set to a server over a network, wherein the server is configured to execute validation software to determine if the negotiable instrument has been previously presented for payment. The computer then receives a validation indicator back from said server to display on the computer.

The method embodiment may be saved as software instructions on a computer readable medium accessible by a computer and executing imaging software and decoding software stored in a computer memory housed in a computer, generating pixel data from the encoded indicia on the instrument, digitizing the pixel data to generate digital pixel data, storing the digital pixel data in the memory, generating a data set by decoding the digital pixel data, and transmitting the data set to a server over a network, wherein the server is configured to execute validation software to determine if the negotiable instrument has been previously presented for payment. The computer then receives a validation indicator back from said server to display on the computer.

DETAILED DESCRIPTION

The terms of this detailed description are intended to have their broadest plain meaning. For example, "software" includes, without limitation, instructions, whether in source code or compiled versions and whether activated by processors, firmware, or other hardware so long as the computerized electronics have the physical parameters that enable actions taken in accordance with the logic of the instructions. "Computer readable media" that implement "computerized methods" also encompass tangible hardware such as data storage media, or communication media including any medium that facilitates sharing data within a system. Computer-readable media generally include tangible computer-readable storage media which are non-transitory in its use of electronic signals or waves that are useful in connection with the media. Non-transitory media recite the computer readable media without relying upon the transitory nature of physical signals. Computer-readable storage media can comprise RAM, ROM, EEPROM, flash memory, or any other medium that can be used to store desired program code in the form of instructions or data structures and that can be accessed and used by a computer.

The term "network" encompasses all forms of data communications traversing an infrastructure designed to share electronic data between at least two devices. Networks often encompass user devices, both wireless and wired, as well as gateways, servers, wireless transceivers, and similar hardware that establish a communications protocol allowing nodes on a network to share information of all kinds. One non-limiting example of a network is the commonly used internet infrastructure.

Figure 1:
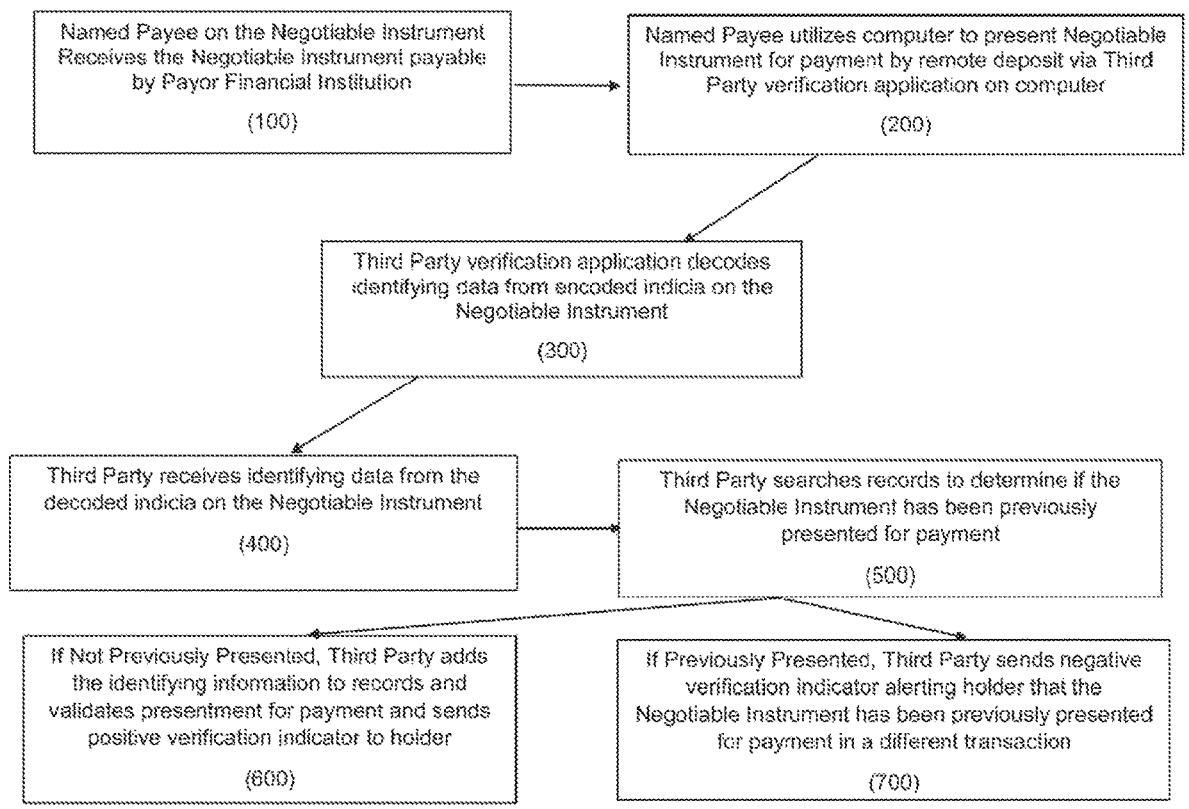
FIG. 1 is a flow chart showing the steps by which a system and method prevent fraudulent attempts at presenting checks for payment more than once.

FIG. 1 outlines a brief synopsis of a system and method by which payor institutions and other holders for value of a check or negotiable instrument can ensure that an instrument 50 received for payout (i.e., exchanged for cash or goods) is valid and has not been previously presented by the payee or a prior holder of the negotiable instrument. The technology for the system, apparatus, and method of this disclosure includes computerized devices, such as smart phones, tablets, personal computers and the like, which are equipped with cameras and imaging devices 801 capable of transmitting image data, related to the instrument 50, to either a payor institution and/or a third party vendor that verifies the status of the negotiable instrument. As set forth in more details in the claims and figures, the system and method described in this application utilize imaging software and hardware that has been used previously in other industries but is presented here for a special purpose. The payor institution may be the financial institution on which the negotiable instrument, or check, is finally drawn, or the payor may be an intermediate lender or check cashing service receiving a check from the payee before depositing to the ultimate payor institution.

To add to the security level for financial transactions, the system described herein incorporates the option of using encoded indicia that can securely incorporate numerous kinds of identifying data about an instrument or check directly thereon. Encoded indicia, as used herein, include but are not limited to bar codes, QR codes, or any kind of printed symbols that relay data in a format that requires decoding to retrieve underlying data from the indicia. In one embodiment, the encoded indicia are printed directly on a check for payment according to the system herein. The system and method also encompass the option of utilizing printed symbols, letters, numbers and/or other images that are not encoded but are simply read or translated into a digital format by appropriate software on a computer.

A holder who is offered a negotiable instrument 50, such as a check or bank draft, for payment would use the system and hardware described herein to ensure that the check had never been previously paid or deposited. Using the technology laid out in more detail in the claim set and the figures, the holder would generate a data set of identifying data related to the instrument by either translated data into a digital format directly or by decoding the indicia with imaging hardware and software connected to decoding software located on the holder's computer (e.g., the holder's smart phone). After decoding the indicia or translating the hard copy text into a digital format, the holder transmits the resulting data set to a third party who has the means to check records and determine if the check has been previously deposited or paid.

The system disclosed herein utilizes a third party database or table of previously presented negotiable instruments to inform holders of a check, or similar paper, of the presentment history of the document. In one embodiment, a payee who presents the negotiable instrument for payment or deposit would use a computer program product, or "app," in conjunction with imaging software and hardware in electronic communication with the app to deposit or present the paper into a payor computer system for payment and simultaneously populate a third party vendor's table or database. Presenting the information on the paper to a payor and the populating of third party database would occur over typical hardware and software creating a network over which the "app" on the payee's electronic device transmits either encoded or decoded data identifying all of the necessary information on the paper, and the transmission would occur via a network of wireless, wired, or both wireless and wired communications infrastructure components. The third party vendor, therefore, would incrementally increase its record entries of presented instruments as users electronically process negotiable instruments with their preferred payor institution. The system and method described herein, however, would also be equally useful if the payor institution transmitted the same kinds of data to the third party vendor.

Using its records for checking, the third party vendor would be able to receive data sets from current holders of circulated negotiable instruments to check and determine if the instrument has already been presented for payment. Upon checking the presented instrument, via a data set created by or accessed by a current holder, the third party vendor, in turn, transmits a validation indicator to inform the current holder of a check or instrument of the results of the third party vendor's presentment validation efforts.

Figure 2:
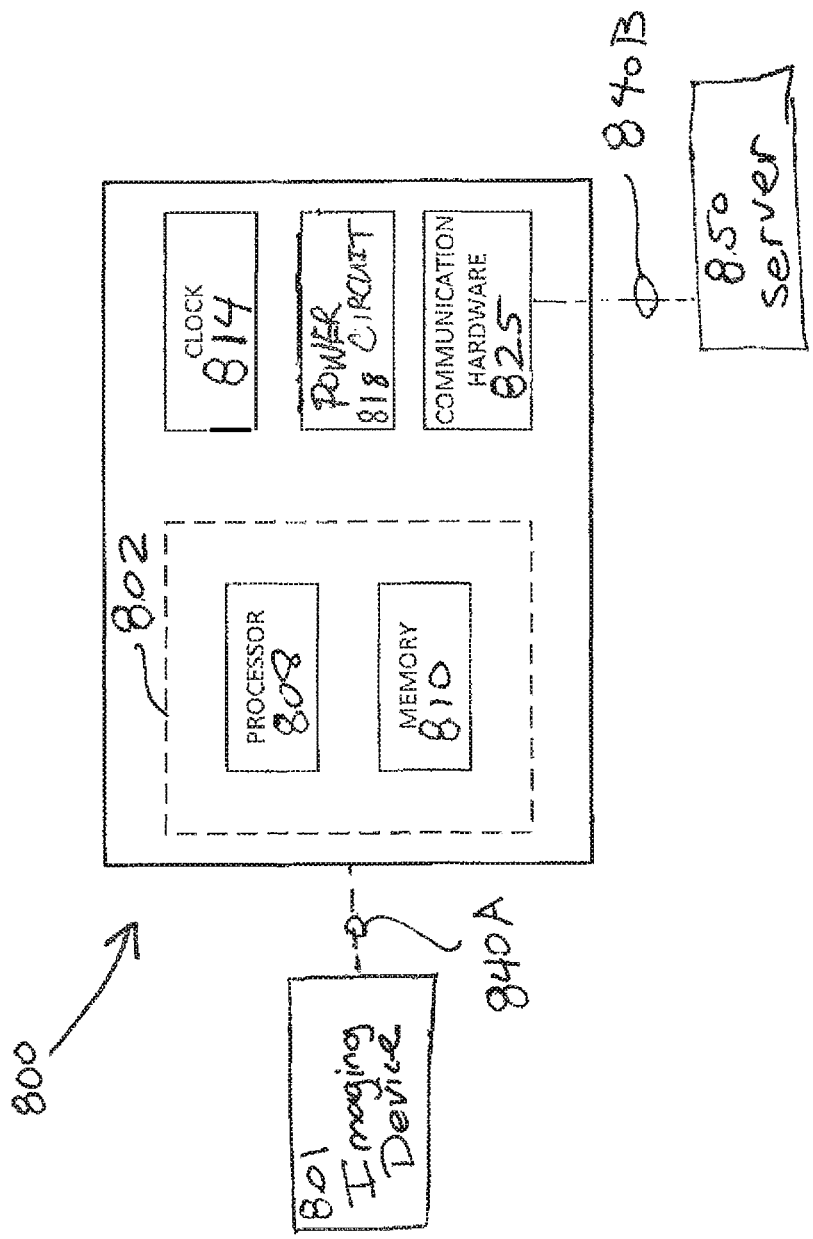
FIG. 2 is a system overview schematic implementing the method described herein.

As shown in FIG. 1 and FIG. 2, the system 800 and method include at 100 a named payee on a negotiable instrument 50 receives the negotiable instrument payable by a payor financial institution. At 200, the named payee utilizes a computerized imaging device 801, such as a properly configured smart phone or tablet, to present the negotiable instrument 50 for payment by remote deposit via a third party verification application that is in electronic communication with and connected to the user computer/imaging device 801 and a server 850. The third party verification application may reside on any number of different computers or a server 850 managed by any entity needing to confirm that the negotiable instrument 50 has not been previously presented for payment in a different electronic transaction. As in typical server-client operations, multiple client devices may access the third party verification application housed on and operated from a server 850.

The third party verification application can be set up in numerous ways by either receiving encoded data from the user's computerized imaging device 801 and decoding the encoded data 300 with a verification computer 802 or in some circumstances, the decoding may occur on the payee-user's computerized imaging device 801 such that the verification computer 802 receives only decoded data to perform verification operations.

As set forth in FIG. 1 at 400, the method and system encompasses a third party verification computer 802 identifying data from either translatable or encoded indicia on the negotiable instrument 50. The third party verification computer incorporates a verification application in the form of software stored in memory 810 and accessible by a processor 808 to verify if the negotiable instrument 50 has ever been previously presented for payment but remained in the hands of the user-payee with no physical indication of such payment.

The third party verification application is configured with an appropriate set of records, stored in memory 810, such as but not limited to a database of records, that track all negotiable instruments 50 such as checks that have been previously submitted for electronic payment but may still be in the hands of a party that can present the physical check for payment again. The third party verification application searches records to determine if the negotiable instrument has been previously presented for payment 500. At 600 in FIG. 1 If the negotiable instrument has not been previously presented for payment, the third party verification application adds identifying information to records in the database and validates presentment for payment. The third party verification application then sends a positive verification indicator to the current holder of the negotiable instrument so that the current holder can exchange the negotiable instrument for goods or cash currency. At 700 in FIG. 1 If the negotiable instrument 50 has been previously presented for payment, the third party verification application adds new indicators of improper re-presenting of checks to the identifying information already in the records in the database. This step invalidates presentment for payment. The third party verification application then sends a negative verification indicator to the current holder of the negotiable instrument so that the current holder can refrain from exchanging the negotiable instrument for goods or cash currency. In some embodiments, the current holder may keep possession of the physical negotiable instrument, or check, to return to the issuing payor financial institution, possibly for a reward or other compensation.

The system and method of this disclosure address a particular concern that has been brought to light due to technology allowing for digital imaging of negotiable instruments and presenting the digital version of the negotiable instruments for payment electronically over a bi-directional communications network 840A and 840B utilizing communications hardware 825 for data sharing.

Numerous advantages and efficiencies result from this system and method disclosed herein. First, the double presenting of checks and other negotiable instruments has been made possible because the payor parties have the technology to efficiently exchange negotiable instruments for funds and currency without taking physical possession of the check. Instead of marring or destroying the physical check or instrument, the system and method of this invention utilize a database or other assembly of records to verify the presentation and payment history for a negotiable instrument and electronically "destroy" the check by ensuring that a current holder of the check is aware that the funds it represents have been previously transferred.

The system may optionally include a connection to the final payor financial institution who actually issued the negotiable instrument so that the third party verification application removes all histories and records of any negotiable instrument 50 that is physically retrieved by the issuing payor financial institution. Such cleansing of the verification records speeds the process of checking presentment data against historical records.

Similarly, the system may also provide electronic indicators in the verification system records of individuals or holders of negotiable instruments who have presented negotiable instruments more than once in a past event. Records of individuals or other holders who have engaged in such activity may be separately recorded in a separately managed memory or a different section of the verification memory 810 for ease of tracking.

In one aspect the system may be useful in the ultimate payor institution receiving information from the verification system that a check has been presented for payment so that a certain account holder's account, to be debited by the payment presentation, can be acknowledged faster. In this way updates, such as debit commands, may be transmitted to the account holder's deposits with the payor institution and may be made before the physical check arrives back at a payor institution. In other words, the system according to this disclosure not only enhances the use of deposits by imaging, but also allows for the ultimate payor institution which is finally responsible for payment of funds backing the negotiable instrument can be made aware that a check has been presented for payment by deposit or otherwise. The verification system described herein then provides an efficient way for account holders' records to be updated not only in a depositing transaction but also in a debiting transaction much faster.

Numerous aspects of the system are further described in the claim set below.

The invention claimed is:

1. A system for determining if a negotiable instrument bearing an encoded indicia has been previously presented for payment, the system comprising:
   a computer comprising:
   memory;
   a processor executing imaging software and decoding software stored in said memory;
   a camera comprising an image reader assembly configured to generate pixel data from the encoded indicia on the instrument,
   wherein the imaging software processes said pixel data to generate digital pixel data and stores the digital pixel data in said memory,
   wherein said processor executes said decoding software by receiving said digital pixel data from said memory and generates a data set from the encoded indicia;
   a transceiver in bi-directional communication with a server on a network, said server comprising a database and validation software, said transceiver transmitting said data set to said server over the network;
   wherein said server is configured to execute said validation software to determine if the negotiable instrument has been previously presented for payment.

2. A system according to claim 1, wherein said computer further comprises a display and said server transmits a validation indicator over the network to the computer for outputting on the display.

3. A system according to claim 2, wherein said validation indicator comprises data indicating if the negotiable instrument has been previously presented for payment.

4. A system according to claim 1, wherein said encoded indicia is a QR code and said data set transmitted to the server comprises at least a portion of information within the indicia.

5. A system according to claim 4, wherein said data set comprises an identification number corresponding to said negotiable instrument and the amount payable by said negotiable instrument.

6. A system according to claim 4, wherein said encoded indicia comprises payor information in addition to said data set transmitted to said server.

7. A system according to claim 6, wherein the system transmits a debit command to a payor issuing the negotiable instrument upon a determination that the negotiable instrument has not be presented for payment previously.

8. A system according to claim 7, wherein said imaging software generating said digital pixel data stores said digital pixel data in addressed frames of data, and said data set comprises at least an addressed subset of said frames of data.

9. A system according to claim 1, wherein said computer is a mobile computer or a smart device.

10. A computer program product for confirming that a negotiable instrument is valid for payment, the computer program product comprising:
- a set of computer instructions stored on non-transitory computer readable media housed in a computer, said instructions configured to be executed by a processor to implement a decoding process in regard to an image of an encoded indicia on the negotiable instrument, wherein said computer instructions comprise:
  - an imaging module that (i) activates a camera in the computer to capture an image of the encoded indicia, (ii) generates a set of digital pixel data corresponding to said encoded indicia, and (iii) stores said digital pixel data in addressed memory locations in the computer;
  - a decoding module that processes at least a portion of the digital pixel data to generate a data set corresponding to a respective portion of digital pixel data stored in memory; and
  - a transmission module configured to execute a data transmission via a network in communication with said computer, the data transmission sending said data set to a remote server that validates the negotiable instrument for payment;
- a second set of computer instructions stored on said non-transitory computer, readable media and executable by said processor to (i) receive via said network a validation indicator from said remote server and (ii) display said validation, indicator on said computer.

11. A computer program product according to claim 10, further configured to establish a field of view for the camera in the computer.

12. A computer program product according to claim 10, wherein said imaging module is configured to process either one dimensional or two dimensional encoded indicia.

13. A computer program product according to claim 10, wherein said encoded indicia comprises banking information, negotiable instrument identifiers, and/or amounts payable by the negotiable instrument.

14. A computer program product according to claim 10, wherein said negotiable instrument is a check.

15. A computerized method of validating a check at presentment, the method comprising:
- executing imaging software and decoding software stored in a computer memory housed in a computer;
- generating pixel data from the encoded indicia on the instrument,
- digitizing said pixel data to generate digital pixel data
- storing the digital pixel data in said memory,
- generating a data set by decoding said digital pixel data;
- transmitting said data set to a server over a network, wherein the server is configured to execute validation software to determine if the negotiable instrument has been previously presented for payment;
- receiving a validation indicator back from said server to display on the computer.

16. A computerized method according to claim 15, wherein said server populates a database of negotiable instruments upon a first presentation for payment.

17. A computerized method according to claim 16, wherein said server searches the database for previous instances of presentation for payment and transmits said validation indicator back to the computer via the network.

18. A computerized method according to claim 15, further comprising, prior to executing said imaging software and said decoding software, entering a type code for the negotiable instrument, said type codes corresponding to respective checks, money orders, and draft orders.

19. A computerized method according to claim 15, wherein generating said data set comprises extracting a subset of said digital pixel data for transmission to the server.

* * * * *